United States Patent [19]

Spiker et al.

[11] Patent Number: 4,569,187
[45] Date of Patent: Feb. 11, 1986

[54] GRASS AND LEAF CATCHING APPARATUS

[75] Inventors: Quentin B. Spiker; Richard L. Holliday; Warren D. Bottenberg, all of Holton, Kans.

[73] Assignee: BMB Company, Inc., Holton, Kans.

[21] Appl. No.: 556,089

[22] Filed: Nov. 29, 1983

[51] Int. Cl.[4] .................... A01D 35/22; A01D 67/00
[52] U.S. Cl. ...................................... 56/202; 56/16.6; 56/208; 298/23 F
[58] Field of Search .............. 56/16.6, 202, 203, 204, 56/205, 208, DIG. 10; 298/6, 19 V, 23 R, 23 F, 23 A

[56] References Cited

U.S. PATENT DOCUMENTS

| | | | |
|---|---|---|---|
| 2,131,326 | 9/1938 | Kaster | 298/6 |
| 2,834,172 | 5/1958 | Wood | 56/208 |
| 3,135,080 | 6/1964 | Christianson | 56/203 |
| 3,778,865 | 12/1973 | Schmidt et al. | 56/16.6 |
| 4,114,353 | 9/1978 | Ansbaugh | 56/202 |
| 4,158,279 | 6/1979 | Jackson | 56/202 |
| 4,426,830 | 1/1984 | Tackett | 56/202 |
| 4,476,668 | 10/1984 | Reilly | 56/202 |

Primary Examiner—Gene Mancene
Assistant Examiner—John G. Weiss
Attorney, Agent, or Firm—Kokjer, Kircher, Bradley, Wharton, Bowman & Johnson

[57] ABSTRACT

A grass catcher for receiving grass clippings and leaves from a rotary deck mower towed by a tractor. A fan driven by the mower forces the clippings through a flexible hose leading to a large capacity hopper. The hopper is mounted on a carriage having a single wheel. A parallel arm linkage permits the hopper to float up and down independently of the mower. When the rope is pulled from the tractor seat, the hopper is dumped to unload its contents. A rear door on the hopper is automatically opened when the hopper is dumped and is closed when the hopper is returned to its running position by pulling on another rope from the tractor seat.

18 Claims, 5 Drawing Figures

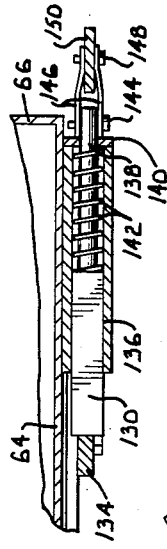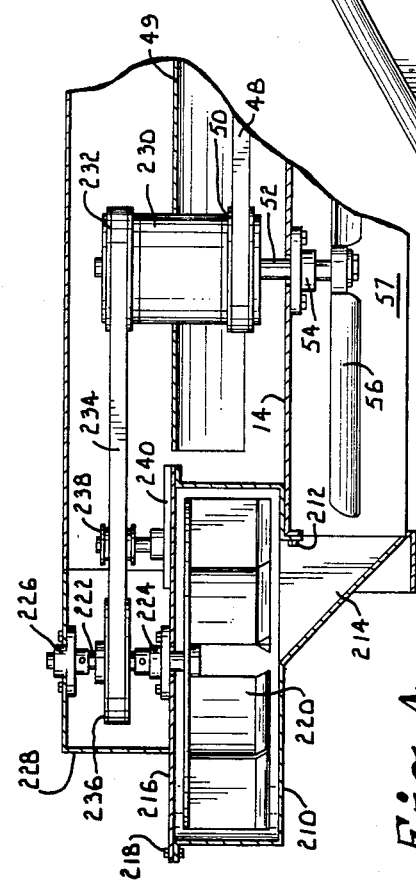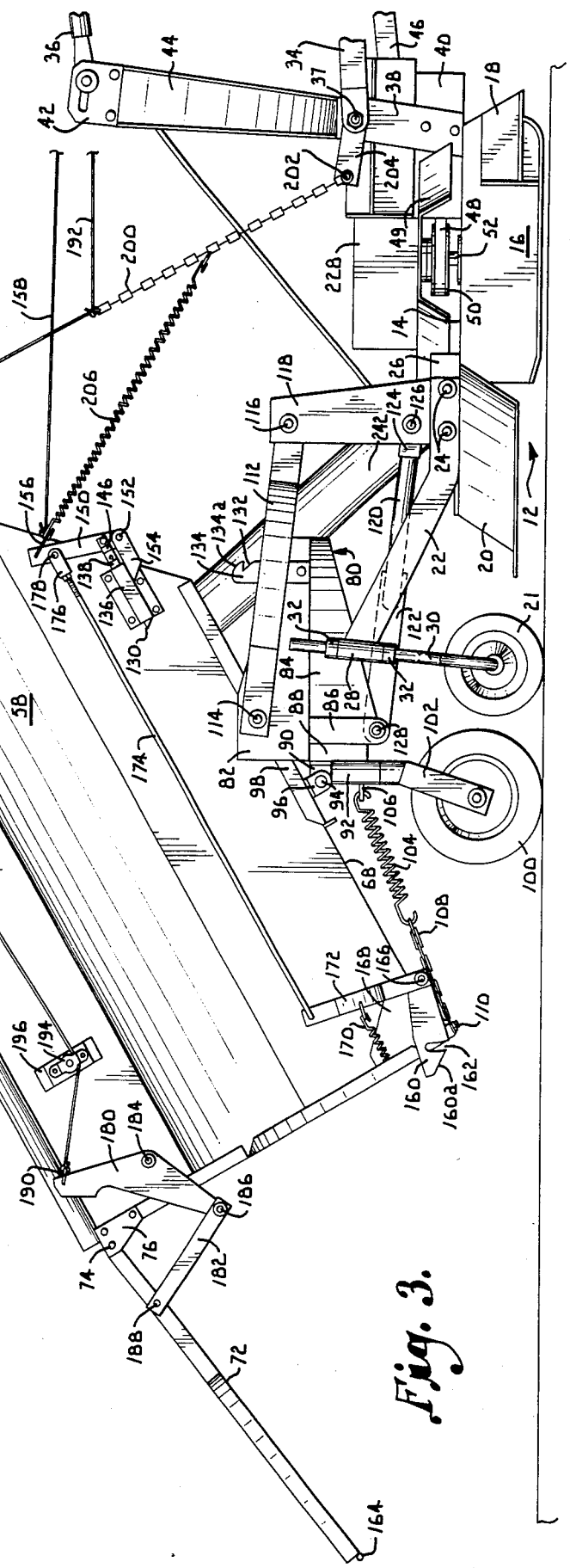

GRASS AND LEAF CATCHING APPARATUS

BACKGROUND AND SUMMARY OF THE INVENTION

This invention relates generally to grounds maintenance equipment and more particularly to a large capacity grass and leaf catcher for use with a rotary deck mower.

In the maintenance of lawns, parks, golf courses and other large grassy areas, mowing is normally carried out by deck type rotary mowers. The mower is typically pulled by a tractor and is driven by the power takeoff shaft of the tractor. In order to achieve a particularly attractive appearance, grass clippings, leaves and other debris are often picked up simultaneously with the mowing operation and deposited in a large capacity container which is subsequently dumped in another location to dispose of its contents.

The present invention is directed to a large capacity grass and leaf catcher which is attached to a rotary deck mower and pulled with the mower by a tractor. It is the primary goal of the invention to provide a grass and leaf catcher which functions in an improved manner compared to the units that have been available in the past.

More specifically, it is an important object of the invention to provide a grass and leaf catcher having a hopper which can be dumped by the operator while he remains seated in the tractor seat.

Another object of the invention is to provide a grass and leaf catcher having a hopper door which opens automatically when the hopper is tilted for dumping and closes automatically when the hopper is returned to its running position.

A further object of the invention is to provide a grass and leaf catcher which is towed along with the mower and yet can move up and down independently of the mower to facilitate travel over uneven terrain. This is accomplished by using a parallel arm linkage to connect the hopper with the mower. The ability of the hopper to float independently of the mower reduces the pulling force needed to pull the mower-hopper combination over uneven ground and thereby permits smaller tractors to be used.

A still further object of the invention is to provide a grass and leaf catcher having a fan which is driven by the mower. All other known units require a separate engine to power the fan which forces the grass clippings and leaves into the container, and the need for a separate engine increases the cost, complexity and maintenance requirements appreciably.

An additional object of the invention is to provide a grass and leaf catcher of the character described which is well suited for use in conjunction with mowers that vary widely in size and style.

Yet another object of the invention is to provide a grass and leaf catcher of the character described which is highly maneuverable in order to permit the mower to closely trim around bushes, trees and other objects on the grounds.

Still another object of the invention is to provide a grass and leaf catcher which is simple and economical to construct and maintain.

In accordance with the invention, we provide a grass and leaf catcher which includes a large capacity hopper pivotally mounted on a carriage having a single ground engaging wheel. The carriage is connected to the mower deck by a parallel arm linkage which permits the mower and hopper to move up and down relative to and independently of one another to facilitate travel over rough ground and other uneven terrain.

The hopper has a hinged rear door which is latched closed when the hopper is in the running position. Another latch holds the hopper in its running position and can be released by pulling on a rope from the driver's seat of the tractor. The door and hopper latches are interconnected to be engaged and released in unison. When the hopper latch is released, the hopper is tilted to the rear to dump its contents, and a door opening linkage controlled by another rope automatically causes the hopper door to open as the hopper is tilted for dumping. When the hopper is raised again to the running position, both the door latch and the hopper latch engage automatically.

It is an important feature of the invention that the fan of the grass and leaf catcher is driven by the mower which is in turn driven by the power takeoff shaft of the tractor. The fan impeller is carried on a shaft which is driven by the mower shaft through a belt drive such that the fan is operated whenever the mower blades are rotated. This drive system eliminates the need for a separate gasoline engine to power the fan, and the expense and maintenace problems are reduced accordingly.

DETAILED DESCRIPTION OF THE INVENTION

In the accompanying drawings which form a part of the specification and are to be read in conjunction therewith and in which like reference numerals are used to indicate like parts in the various views:

FIG. 3 is a side elevational view similar to FIG. 2, but showing the hopper in its dumping position;

FIG. 4 is a fragmentary sectional view on an enlarged scale taken generally along line 4—4 of FIG. 1 in the direction of the arrows; and FIG. 5 is a fragmentary sectional view on an enlarged scale taken generally along line 5—5 of FIG. 2 in the direction of the arrows.

Figure 1:
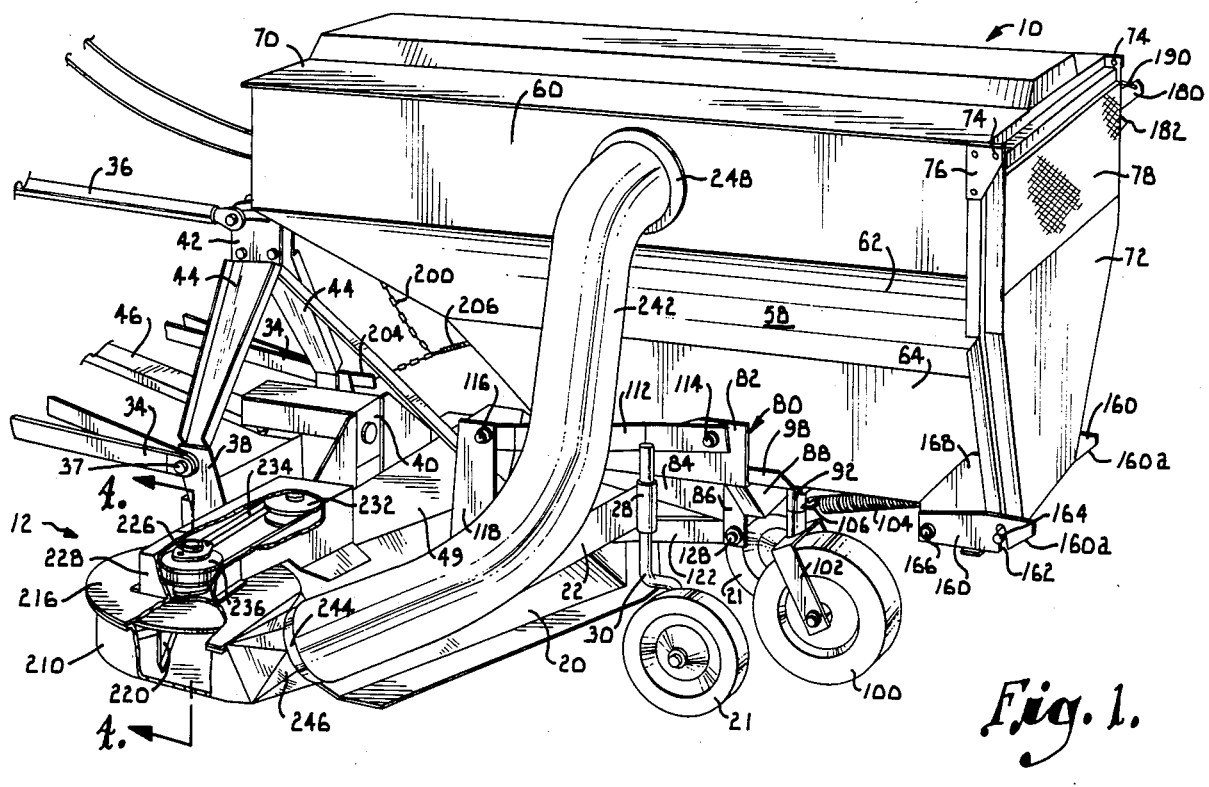
FIG. 1 is a perspective view of a rotary deck mower equipped with a grass and leaf catcher constructed according to a preferred embodiment of the present invention, with portions broken away for purposes of illustration.

Referring now to the drawings in more detail, the present invention is directed to a grass and leaf catcher having a hopper 10 which is connected with a conventional rotary deck mower 12. Although the leaf and grass catcher can be used with various types and styles of mowers, the mower 12 shown in the drawing includes a generally horizontal deck 14 having downwardly extending opposite sides, one of which is indicated at 16 in FIGS. 2 and 3. The deck 14 also has an inclined front panel 18 and a rear safety shield 20.

The mower 12 has a pair of rear wheels 21 mounted on respective arms 22 which extend rearwardly from the deck 14. The front end of each arm 22 is bolted at 24 to a bracket plate 26. The bracket plates 26 are welded or otherwise suitably secured on top of the mower deck 14. The back end of each arm 22 carries a generally vertical sleeve 28. The wheels 21 are rotatably mounted on rods 30 which extend through the sleeves 28 and can turn therein to accommodate turning of the wheels. Collars 32 are fixed to each rod 30 above and below the sleeve 28.

The mower 12 is towed by a tractor (not shown) having a conventional three point hitch which includes a pair of lower hitch arms 34 and an upper control arm 36. The lower hitch arms 34 are pinned at 37 to bracket plates 38 which are bolted to a gear box 40 mounted on top of the mower deck 14. The upper control arm 36 of the tractor hitch is pinned between a pair of bracket plates 42 located on the upper ends of a pair of beams 44. The beams 44 are secured at their lower ends to the bracket plates 38.

The mower 12 has a drive shaft 46 which connects with and is driven by the power takeoff shaft of the tractor. Drive shaft 46 extends into the gear box 40. The output from the gears within the gear box 40 drive a plurality of belts 48. The belts 48 are enclosed by a belt shield 49 mounted on the mower deck. As best shown in FIG. 4, each belt 48 is drawn around a sheave 50 carried on a vertical mower shaft 52. Each shaft 52 is supported for rotation by a bearing 54 bolted to the underside of the mower deck 14. A rotary mower blade 56 is carried on the bottom end of each shaft 52 in a chamber 57 formed beneath deck 14. The mower blades 56 are thus driven rotatively by the power takeoff system of the tractor in order to cut grass. Normally, there are a plurality of rotary blades 56 on the mower 12, and the blades may or may not overlap.

The hopper 10 which forms the container for the grass and leaf catcher of the present invention includes a pair of opposite side panels 58. Each side panel 58 has a vertical top wall section 60, a center wall section 62 which inclines inwardly from top to bottom, and a vertical lower wall section 64. This gives the container the configuration of a hopper having a narrower width at the bottom than at the top. The hopper 10 is closed at the front by a front panel 66 and at the bottom by a bottom panel 68. A top panel 70 covers the top of the hopper.

The hopper 10 has an open back end which is closed by a hinged door 72 when the hopper is in its running position. The opposite sides of the door 72 are provided with projecting pins 74 near their top ends. The pins 74 extend through openings formed in bracket plates 76 secured to the upper sidewalls of the hopper 10. The aligned pins 74 establish a horizontal hinge axis about which the door 72 can swing between the open position shown in FIG. 3 and the closed position shown in FIG. 1. As best shown in FIG. 1, the top portion of the door 72 is provided with a grill 78 which serves as an exhaust for the fan which will subsequently be described.

The hopper 10 is pivotally mounted on a carriage generally identified by numeral 80. The carriage 80 includes opposite side plates 82 which embrace and are located adjacent to the lower sidewalls 64 of the hopper. The carriage 82 extends beneath the bottom panel 68 of the hopper and includes lower side panels 84 which extend inwardly from front to back. A pair of apertured bracket plates 86 are located at the rear edges of the lower sidewalls 84. A back wall 88 of the carriage is located immediately behind the bracket plates 86 and is provided with a pair of ears 90 and a sleeve 92. A horizontal pin 94 pivotally connects the ears 90 with another pair of ears 96 extending from a hinge plate 98 secured to the bottom panel 68 of the hopper. The pin 94 establishes a horizontal pivot axis about which hopper 10 can pivot relative to carriage 82 between the running position shown in FIG. 2 and the tilted dumping position shown in FIG. 3.

A wheel 100 supports the hopper for movement with the mower 12 along the ground. The wheel 100 is mounted for rotation on the lower end of a fork 102 having its shaft extending through and rotatable in the sleeve 92 to accommodate turning of the wheel.

The hopper 10 is continuously urged toward its dumping position by a tension spring 104 having its front end hooked to a lug 106 projecting from sleeve 92. The opposite end of spring 104 is hooked to one end of a chain 108 having its opposite end bolted at 110 to the back end of the bottom panel 68. The tension spring 104 exerts a continuous force on the hopper 10 which urges the hopper about pin 94 in a direction to move the hopper toward the dumping position.

The carriage 80 is connected with the mower 12 by a parallel arm linkage which permits the hopper 10 to move up and down relative to and independently of the mower. The linkage includes a pair of bent upper arms 112 which are pivotally connected at their back ends with the respective side panels 82 of the carriage. These connections are made by pivot couplings 114. The opposite or forward end of the upper arms 112 are pivotally connected at 116 with vertical bracket plates 118 which are secured at their lower ends to the plates 26 on the mower deck.

The lower arms of the parallel arm linkage are formed by a pair of arms 120 which angle outwardly from back to front. The arms 120 extend from the body 122 of a pull bar. The arms 120 carry plates 124 on their forward ends which are pivotally secured by couplings 126 with the bracket plates 118. Couplings 126 are located well below couplings 116. The back end of the body 122 of the pull bar is pivotally connected between plates 86 by a horizontal pin 128 extending between the plates 86 and through the body 122 of the pull bar. Pin 128 is spaced below couplings 114 the same distance as the spacing between couplings 116 and 126.

The lower arms 120 are parallel at all times with the upper arms 112 when viewed from the side (see FIG. 3). Due to the parallel arrangement of the upper and lower arms and their pivotal connections with the carriage 80 and the mower 12, the carriage and hopper 10 can move up and down independently of the mower when traversing rough or uneven terrain. Thus, the wheel 100 can travel over a hump or other high spot while the mower wheels 21 are located in a rut or other low spot, and the force necessary to tow the combination mower-grass catcher is reduced so that a smaller tractor can be used to pull the equipment.

The hopper 10 is latched in its running position by a latch bolt 130 having a beveled head which fits in a V-shaped notch 132 formed in an anchor bracket 134. The head portion of bracket 134 has a curved edge 134a adjacent notch 132. The anchor bracket 134 is bolted or otherwise fixed to one of the side panels 82 of carriage 80. The latch bolt 130 is mounted to slide in a square tube formed in a latch bracket 136 secured to the lower wall section 64 of one of the hopper side panels.

As best shown in FIG. 5, the latch bolt 130 has a shaft portion 138 on the end opposite the beveled head. The shaft 138 extends slidably through a back plate 140 of the bracket 136. A compression spring 142 is coiled around the shaft 138 and engages the end panel 140 at one end and the head portion of the latch bolt 130 at the other end. The compression spring 142 thus continually urges the latch bolt 130 to the rear toward a latching position wherein the latch bolt is received in notch 132 of the anchor bracket 134.

With continued reference to FIG. 5 in particular, the back end of the shaft 138 is pivotally secured at 144 between a pair of connecting straps 146. Another pivot pin 148 pivotally connects a lever 150 between the forward ends of the straps 146.

Figure 2:
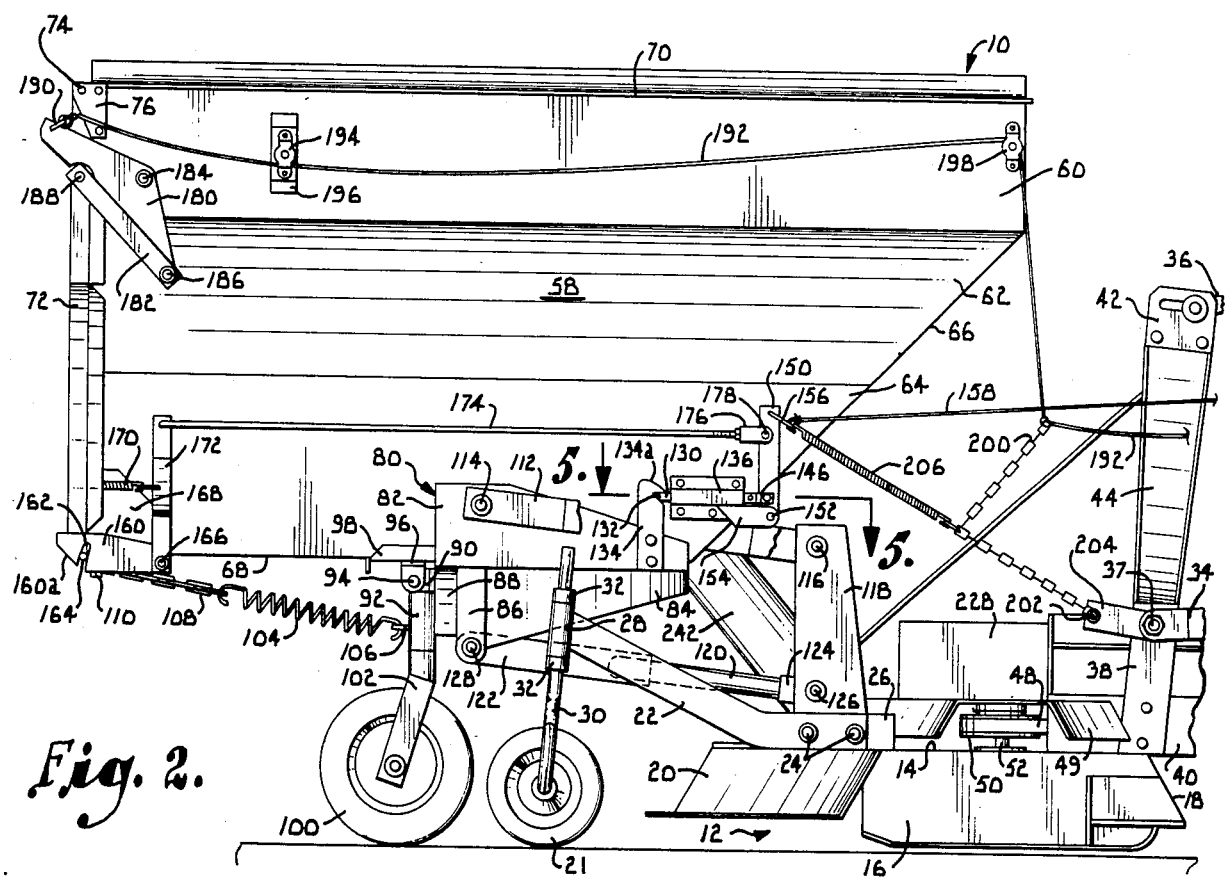
FIG. 2 is a side elevational view of the mower and the attached grass and leaf catcher, with the hopper in its running position.

Referring now to FIGS. 2 and 3, the lower end of lever 150 is pivotally secured at 152 between a pair of ears 154 projecting from the latch bracket 136. An S-hook 156 is hooked to the top end of lever 150 and to one end of a rope 158. The opposite end of the rope 158 is located adjacent to the operator's seat of the tractor so that the driver can pull on the rope while remaining seated. This pulls lever 150 about pivot pin 152 and thus pulls the latch bolt 130 out of notch 132 to its release position, thereby releasing the hopper latch. When the latch is released, the tension spring 104 tilts hopper 10 to the dumping position wherein the back end is lower than the front end to dump the contents of the hopper.

The hopper door 72 is normally latched in the closed position by a pair of latch plates 160 having notches 162 in their lower edges. Each latch plate 160 has a beveled edge 160a adjacent notch 162. The notches 162 normally receive pins 164 projecting in opposite directions from the bottom of the door, and the latch plates then latch the door in its closed position. A horizontal rod 166 extends beneath the hopper 10 and through openings formed in gusset plates 168 secured to the lower sidewalls 64 of the hopper. Rod 166 can turn relative to the gusset plates 168. The opposite ends of rod 166 are secured to the latch plates 160 to pivotally mount the two latch plates for movement in unison between the latching position shown in FIGS. 1 and 2 and the release position shown in FIG. 3. A tension spring 170 is hooked at one end to one of the gusset plates 168 and at the opposite end to a lever arm 172 which forms an extension of one of the latch plates 160. The biasing force of the spring 170 continually urges the latch plates 60 toward the latching position.

The door latch is moved between the latching and release positions in unison with the hopper latch. This is accomplished by a linkage formed by a horizontal rod 174 which extends between levers 150 and 172. The back end of the rod 174 is hooked to the top end of lever 172. The front end of the rod is threaded to receive a clevis 176 which is pivotally pinned at 178 to lever 150 at a location slightly below the S-hook 156. When rope 150 is pulled, lever 150 is pulled to release the hopper latch, and rod 174 in turn pulls lever 172 to release the door latch. Conversely, when either lever 150 or 172 moves to the latching position, rod 174 forces the other lever to the latching position.

When hopper 10 is tilted to the dumping position, the hopper door 72 is opened by a linkage formed by a pivot plate 180 and a rigid link 182. The pivot plate 180 is pivotally mounted at 184 to the upper sidewall 60 on one side of the hopper. The lower end of plate 180 is pivoted at 186 to one end of the link 182. The opposite end of the link is pivoted at 188 to the hopper door 172.

A ring 190 is secured to the top end of the pivot plate 180, and one end of a rope 192 is tied to the ring. The rope is passed beneath a small pulley 194 carried on a pulley bracket 196 secured to the upper sidewall 60 of the hopper. The rope is passed over another pulley 198 secured to the upper sidewall near its front end. The rope extends downwardly from pulley 198 and is tied to one end of a chain 200 having its opposite or lower end secured at 202 to a plate 204 extending from one of the bracket plates 38. The rope 192 extends forwardly from chain 200, and its front end is located adjacent to the operator seat of the tractor so that it can be pulled from the operator's seat. A tension spring 206 is hooked at one end to a chain link located near the center of chain 200 and at the opposite end to the S-hook 156. When the hopper is tilted to the dumping position shown in FIG. 3, the rope 192 extends the door opening linkage from the collapse position of FIG. 2 to the expanded position of FIG. 3 and thereby forces the door to open. When the hopper is returned to the running position, the linkage returns to the collapsed or folded condition in which the door is closed and latched in the closed position by the latch plates 160.

Grass clippings, leaves and other debris are picked up and forced into the hopper 10 by a fan or blower which is powered by the mower 12. As best shown in FIGS. 1 and 4, a fan housing 210 is attached to one end of the mower deck 14 by a plurality of bolts 212 which connect flanges on the fan housing 210 and the mower deck 14. The housing 210 has an inlet chute 214 which connects the interior of the fan housing with the chamber 57 in which the mower blades 56 operate. A cover plate 216 is secured to the top of the fan housing 210 by a series of bolts 218.

A fan impeller 220 located within the fan housing 210 is carried on the bottom end of a drive shaft 222 for the fan. Shaft 222 is supported for rotation by a pair of bearings 224 and 226. The lower bearing 224 is mounted on top of the cover plate 216, and the upper bearing 226 is mounted to the top panel of a shield 228 which encloses the belt drive system which powers the fan. The shield 228 is bolted to the cover plate 216 of the fan housing and to the belt shield 49.

The fan is driven from one of the mower shafts 52. With reference to FIG. 4, a cylindrical spacer 230 is interposed between sheave 50 and another sheave 232 located within the shield 228 above the lower sheave 50. Both sheaves 50 and 232 are mounted rigidly on shaft 52 for rotation therewith. The fan shaft 222 is driven by a belt 234 which is drawn around sheave 232 and another sheave 236 mounted rigidly on shaft 222. The tension of belt 234 can be adjusted by an idler pulley 238 mounted on an adjustment plate 240. Plate 240 is bolted on top of the cover plate 216 and can be adjusted thereon to change the position of the idler 238 in a manner to increase or decrease the belt tension.

Referring now to FIG. 1 in particular, the grass clippings and leaves are directed from the fan housing 210 into the hopper 10 through a flexible hose 242. The hose 242 is preferably pleated such that it can be extended without undue stress when the hopper 10 is pivoted to the dumping position. One end of the hose is secured by a hose clamp 244 to an outlet chute 246 of the fan housing. The opposite or upper end of hose 242 is connected to a flanged inlet 248 on the upper sidewall 60 on one side of the hopper.

In operation, the tractor hitch arms 34 and 36 are connected with the mower 12 in the manner indicated previously. The mower and the grass and leaf catcher are towed by the tractor through the area that is to be mowed. The power takeoff shaft of the tractor drives shaft 46 which in turn drives belts 48 through the gear train (not shown) located in the gear box 40. The belts 48 drive the mower blades 56 and, through belt 234, drive the fan impeller 220.

The grass clippings produced by the mower blades 56 and other debris such as leaves which are encountered by the mower are drawn by the fan impeller 220 through chute 214 into the fan housing 210. The grass clippings and leaves are discharged from the fan housing through the outlet chute 246 into the flexible hose 242 which transfers the materials into the large capacity hopper 10.

When the hopper is full, it can be dumped simply by the driver of the tractor pulling on rope 158 from his station in the tractor seat. When rope 158 is pulled, lever 150 is pulled forwardly about pivot coupling 152 to withdraw the latch bolt 130 from notch 132 to release the hopper latch. When the latch has been released, the tension spring 104 pivots hopper 10 about pin 94 from the running position of FIG. 2 to the dumping position of FIG. 3.

The hopper door latch is released simultaneously with the hopper latch. When lever 150 is pulled forwardly, rod 174 causes lever 172 to be pulled forwardly which turns the rod 166. The rod pivots latch plates 160 to the release position in which pins 164 are released from notches 162 so that the hopper door 72 can be opened.

As the hopper pivots toward the dumping position, rope 192 becomes taut, as does chain 200. Rope 192 begins to pull on the pivot plate 180, causing it to turn progressively in a clockwise direction about pin 184 (as viewed in FIGS. 2 and 3). This rotation of plate 180 causes link 182 to apply a force on the hopper door 72 tending to open it about the hinge axis formed by pins 74. As the linkage formed by plate 180 and link 182 moves from the collapsed condition of FIG. 2 to the expanded condition of FIG. 3, the hopper door 72 is progressively pivoted open and is fully opened when the hopper reaches its dumping position. The extent to which the hopper door opens can be adjusted by changing the portion of rope 192 which is tied to chain 200. In this manner, the hopper door 72 is automatically forced open as the hopper tilts to the dumping position. The three point tractor hitch can be raised if desired to raise the mower and the front end of the hopper to more completely discharge the hopper contents.

Once all of the grass clippings, leaves and other debris in hopper 10 have been dumped, the hopper can be returned to its running position by the operator pulling on the end of rope 192 from his station on the driver's seat of the tractor. The pulling force on rope 192 exerts a force on the hopper tending to rotate it about pin 94 back to the running position. As the hopper approaches the running position, the tension in spring 206 is gradually relaxed, and springs 142 and 170 are able to gradually return the hopper latch and door latch to their latching positions.

At the same time, rope 192 gradually slackens, and gravity returns the hopper door 72 to the closed position. As the door approaches its fully closed position, the pins 164 are able to move along the edges 160a of latch plates 160 and into the notches 162 for latching of the door. Similarly, the beveled surface of latch bolt 130 is able to ride along the curved edge 134a of bracket 134 such that the latch bolt enters notch 132 when the hopper reaches the running position. The force exerted on the latches by spring 206 causes the latches to gradually approach their latching positions and thereby facilitates automatic latching of both the hopper and door latches when the hopper reaches its running position. Spring 206 also prevents chain 200 from hanging loosely and possibly becoming entangled with adjacent components when the hopper is in the running position.

It is thus apparent that the operator can dump the contents of the hopper 10 and thereafter return the hopper to its running position while remaining in the tractor seat. Due to the drive system which operates the fan of the grass catcher from the mower, there is no need for a separate engine to power the fan. Consequently, the costs, complexity and maintenance requirements associated with a separate engine are avoided, thereby providing the unit with significant advantages over all other units known to us.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

Since many possible embodiments may be made of the invention without departing from the scope thereof, it is to be understood that all matter herin set forth or shown in the accompanying drawings is to be interpreted as illustrative and not in a limiting sense.

Having thus described the invention, we claim:

1. Grass catching apparatus for use with a mower towed by an implement having an operator's station, said apparatus comprising:

a container for receiving and holding grass clippings and the like, said container having a front end and an open back end for dumping of the container contents;

a wheel assembly supporting said container for movement along the ground;

means for mounting said container on said wheel assembly in a manner permitting the container to move about a generally horizontal pivot axis between a running position and a dumping position for dumping of the contents of said container through the back end thereof;

yieldable means for urging said container toward the dumping position;

releasable latch means for holding said container in the running position, said latch means automatically engaging upon movement of said container to the running position and being releasable to permit movement to the dumping position under the influence of said yieldable means;

means for connecting said container to the mower to be towed therewith by the implement;

a fan housing adapted for connection to the mower to receive grass clippings and the like therefrom;

a flexible conduit extending from said fan housing to said container to deliver grass clippings and the like therebetween;

fan means for drawing grass clippings and the like into said fan housing and forcing same through said conduit and into said container;

a dumping linkage coupled with said latch means and operable from the operator's station to effect release of said latch means, whereby said container moves to the dumping position under the influence of said yieldable means;

a door on said container mounted thereon for hinged movement between open and closed positions wherein said back end of the container is opened and closed, respectively;

means for moving said door to the open position when said container is moved to the dumping position and to the closed position when said container is moved to the running position; and a container raising linkage operable from the operator's station to effect movement of said container from the dumping position to the running position.

2. The invention of claim 1, wherein said latch means includes:

a hopper latch element mounted on said container for movement between a latching position and a release position;

a bracket on said wheel assembly engaged by said latch element in the latch position thereof to latch said container in the running position, said latch element being released from said bracket in the release position to release said container for movement to the dumping position under the influence of said yieldable means;

means for biasing said latch element toward the latching position; and a lever connected with said latch element to effect movement thereof to the release position when said lever is pulled.

3. The invention of claim 2, wherein said latch release means includes a flexible line having one end connected with said lever and an opposite end located adjacent the operator's station, whereby said line can be pulled from the operator's station to pull said lever for release of said latch element.

4. The invention of claim 2, including:

a door latch member mounted on said container for movement between latching and release positions, said door latch member engaging said door in the latching position to latch the door in the closed position and releasing from said door in the release position to release the door for movement to the open position;

means for biasing said door latch member toward the latching position; and release means for said door latch member for urging same to its release position when the said hopper latch element is moved to its release position.

5. The invention of claim 4, wherein said release means for said door latch member includes:

a second lever connected with said door latch member to effect movement thereof to the release position when said second lever is pulled; and linkage means connecting the first mentioned lever and the second lever in a manner to pull both levers together in unison.

6. The invention of claim 5, wherein said latch release means comprises a flexible line having one end connected with the first lever and an opposite end located adjacent the operator's station, whereby said line can be pulled from the operator's station to pull the first lever and the second lever through said linkage means.

7. The invention of claim 4, including means for gradually returning said hopper latch element and said door latch member to the latching positions thereof as said container moves from the dumping position to the running position.

8. The invention of claim 5, including spring means applying a spring force on said first lever for holding said hopper latch element and said door latch member in the release positions thereof when said container is in the dumping position, said spring means being arranged to gradually reduce said spring force as the container moves from the dumping position toward the running position, whereby said biasing means for the hopper latch element and the door latch member gradually move said element and member from the release positions thereof to the latching positions thereof as said container moves from the dumping position to the running position.

9. The invention of claim 1, wherein said means for moving said door to the open position includes:

an expandable and collapsible linkage connected at one end with said container and at another end with the door, said linkage having an expanded condition wherein the door is in the open position and a collapsed condition wherein the door is in the closed condition; and means for effecting the expanded condition of said linkage in response to movement of said container to the dumping position.

10. The invention of claim 9, wherein said means for effecting the expanded condition of said linkage includes:

a flexible line having one end connected with said linkage;

pulley means on said container receiving said line; and a flexible member having one end fixed to the mower and an opposite end fixed to said line at a location offset from said one end thereof, said flexible member and line being tensed as said container moves from the running position to the dumping position with the tension effecting the expanded condition of said linkage.

11. The invention of claim 10, including a tension spring having one end connected with said flexible member and an opposite end connected with said latch means, said tension spring being stretched in the dumping position of said container to apply a force on said latch means permitting same to gradually move from a release position to a latching position thereof as said container is moved from the dumping position to the running position.

12. The invention of claim 1, including:

a flexible line having one end connected with said container and an opposite end located adjacent the operator's station to permit the line to be pulled therefrom; and pulley means on said container receiving said line and arranged to apply a force on said container for moving same from the dumping position to the running position when said line is pulled.

13. The invention of claim 1, wherein said connecting means comprises parallel arm means extending between the container and mower in a manner permitting said container to move up and down relative to and independently of the mower when uneven terrain is traversed.

14. The invention of claim 13, wherein said parallel arm means includes:

a pair of upper arms each having one end pivoted to the mower and another end pivoted to said wheel assembly; and a pair of lower arms spaced below and parallel to said upper arms, each of said lower arms having one end pivoted to the mower and another end pivoted to said wheel assembly.

15. Grass catching apparatus for attachment to a wheel mounted mower towed by an implement, said apparatus comprising:
- a container for receiving and holding grass clippings and the like;
- a carriage having ground engaging wheel means supporting said container for movement along the ground;
- means for mounting said container on said carriage for movement of the container about a generally horizontal pivot axis between a running position and a dumping position for dumping of the container contents;
- door means on said container for opening same to permit dumping of the container contents in the dumping position;
- an upper tow arm having opposite ends, one end being pivoted to the mower and the other end being pivoted to said carriage;
- a lower tow arm having opposite ends, one end being pivoted to the mower and the other end being pivoted to said carriage;
- said upper and lower tow arms being substantially parallel to one another and connecting said carriage to the mower to be towed therewith by the implement in a manner permitting said container to move up and down relative to and independently of the mower when uneven terrain is traversed without impeding movement of the container on the carriage between the running and dumping positions;
- means for effecting movement of said container between the running and dumping positions;
- a fan housing connected to the mower at a location to receive grass clippings and the like therefrom;
- a conduit extending from said fan housing to said container to transfer grass clippings and the like therebetween; and
- fan means in said fan housing for drawing grass clippings and the like into said fan housing and transferring the clippings through said conduit into said container.

16. The invention of claim 15, wherein:
- said container includes a pair of opposite side panels; and
- said carriage includes a pair of opposite sides located adjacent to and outwardly of the respective side panels.

17. Grass catching apparatus for use with a mower towed by an implement having an operator's station, said apparatus comprising:
- a container for receiving and holding grass clippings and the like, said container having a front end and an open back end for dumping of the container contents;
- a wheel assembly supporting said container for movement along the ground;
- means for mounting said container on said wheel assembly in a manner permitting the container to move about a generally horizontal pivot axis between a running position and a dumping position for dumping of the contents of said container through the back end thereof;
- yieldable means for urging said container toward the dumping position;
- releasable container latch means for holding said container in the running position, said container latch means automatically engaging upon movement of said container to the running position and being releasable to permit movement to the dumping position under the influence of said yieldable means;
- means for connecting said container to the mower to be towed therewith by the implement;
- a fan housing adapted for connection to the mower to receive grass clippings and the like therefrom;
- a flexible conduit extending from said fan housing to said container to deliver grass clippings and the like therebetween;
- fan means for drawing grass clippings and the like into said fan housing and forcing same through said conduit and into said container;
- latch release means operable from the operator's station to effect release of said latch means, whereby said container moves to the dumping position;
- a door on said container mounted thereon for hinged movement between open and closed positions wherein said back end of the container is opened and closed, respectively;
- releasable door latch means for holding said door in the closed position;
- linkage means connecting said container latch means and said door latch means in a manner to effect release of said container latch means and said door latch means in unison;
- means for moving said door to the open position when said container is moved to the dumping position and to the closed position when said container is moved to the running position; and
- spring means for applying a spring force on said container latch means and said door latch means to hold the container latch means and door latch means in the release conditions thereof when said container is in the dumping position, said spring means being arranged to gradually reduce said spring force as the container moves from the dumping position toward the running position, whereby each of said container latch means and said door latch means gradually moves from its release condition to its latching condition as said container moves from the dumping position to the running position.

18. Grass catching apparatus for use with a mower towed by an implement having an operator's station, said apparatus comprising:
- a container for receiving and holding grass clippings and the like, said container having a front end and an open back end for dumping of the container contents;
- a wheel assembly supporting said container for movement along the ground;
- means for mounting said container on said wheel assembly in a manner permitting the container to move about a generally horizontal pivot axis between a running position and a dumping position for dumping of the contents of said container through the back end thereof;
- yieldable means for urging said container toward the dumping position;
- releasable latch means for holding said container in the running position, said latch means automatically engaging upon movement of said container to the running position and being releasable to permit movement to the dumping position under the influence of said yieldable means;

means for connecting said container to the mower to be towed therewith by the implement;

a fan housing adapted for connection to the mower to receive grass clippings and the like therefrom;

a flexible conduit extending from said fan housing to said container to deliver grass clippings and the like therebetween;

fan means for drawing grass clippings and the like into said fan housing and forcing same through said conduit and into said container;

latch release means operable from the operator's station to effect release of said latch means, whereby said container moves to the dumping position;

a door on said container mounted thereon for hinged movement between open and closed positions wherein said back end of the container is opened and closed, respectively;

an expandable and collapsible linkage connected at one end with said container and at another end with the door, said linkage having an expanded condition wherein the door is in the open position and a collapsed condition wherein the door is in the closed condition;

a flexible line having one end connected with said linkage;

pulley means on said container receiving said line; and a flexible member having one end fixed to the mower and an opposite end fixed to said line at a location offet from said one end thereof, said flexible member and line being tensed as said container moves from the running position to the dumping position with the tension effecting the expanded condition of said linkage.

* * * * *